United States Patent
Egloff et al.

(10) Patent No.: US 11,754,831 B2
(45) Date of Patent: Sep. 12, 2023

(54) OPTICAL ARRANGEMENT AND METHOD FOR CORRECTING CENTRATION ERRORS AND/OR ANGLE ERRORS

(71) Applicant: CARL ZEISS MICROSCOPY GMBH, Jena (DE)

(72) Inventors: Thomas Egloff, Jena (DE); Ralph Lange, Jena (DE); Alexander Scheps, Adelebsen (DE); Johannes Winterot, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 203 days.

(21) Appl. No.: 16/946,074

(22) Filed: Jun. 4, 2020

(65) Prior Publication Data
US 2020/0386988 A1    Dec. 10, 2020

(30) Foreign Application Priority Data
Jun. 5, 2019    (DE) .......................... 102019208232.7

(51) Int. Cl.
*G02B 27/00* (2006.01)
*G02B 7/182* (2021.01)
(Continued)

(52) U.S. Cl.
CPC ......... *G02B 27/0068* (2013.01); *G02B 7/182* (2013.01); *G02B 7/1805* (2013.01);
(Continued)

(58) Field of Classification Search
CPC .. G02B 27/0068; G02B 7/182; G02B 7/1805; G02B 21/002; G02B 21/0024;
(Continued)

(56) References Cited

U.S. PATENT DOCUMENTS 2,780,140 A * 2/1957 Luboshez .............. G02B 13/10
353/69
2,828,670 A * 4/1958 Luboshez .............. G02B 13/10
359/678
(Continued)

FOREIGN PATENT DOCUMENTS

DE          4433763 A1      5/1996
DE       102017114033 A1   12/2018
(Continued)

*Primary Examiner* — Ricky D Shafer
(74) *Attorney, Agent, or Firm* — Brake Hughes Bellermann LLP

(57) ABSTRACT

The invention relates to an optical arrangement and a method for correcting centration errors and/or angle errors in a beam path. The beam path here comprises an optical compensated system in which at least two optical elements are present and aligned relative to one another such that imaging aberrations of the optical elements are compensated. According to the invention, a correction unit is arranged in an infinity space of the beam path and between the at least two optical elements, wherein the correction unit changes the propagation direction of radiation propagating along the beam path and the correction unit either has a reflective surface or is embodied to be transmissive for the radiation. The correction unit is movable such that the angle of a change in the propagation direction can be set.

4 Claims, 7 Drawing Sheets

(51) Int. Cl.
 *G02B 7/18* (2021.01)
 *G02B 21/00* (2006.01)
(52) U.S. Cl.
 CPC ..... *G02B 21/0052* (2013.01); *G02B 27/0025* (2013.01); *G02B 21/002* (2013.01)
(58) Field of Classification Search
 CPC ............ G02B 21/0036; G02B 21/0052; G02B 27/0025; G02B 27/0031
 USPC ....... 359/831, 837, 861, 368, 379, 381, 384, 359/637
 See application file for complete search history.

(56) References Cited

U.S. PATENT DOCUMENTS

| | | | | |
|---|---|---|---|---|
| 4,850,686 A * | 7/1989 | Morimoto | .......... | G02B 26/0891 359/837 |
| 6,020,955 A | 2/2000 | Messina | | |
| 6,429,982 B2 * | 8/2002 | Bolt | .................. | G02B 26/0883 359/837 |
| 8,873,123 B2 * | 10/2014 | Murayama | ......... | G02B 21/0072 359/385 |
| 10,295,811 B2 * | 5/2019 | Svoboda | ............ | G02B 21/0076 |
| 2002/0154396 A1 * | 10/2002 | Overbeck | .......... | G01N 21/6458 359/223.1 |
| 2002/0176076 A1 * | 11/2002 | Bouzid | .................. | G02B 21/06 356/318 |
| 2005/0213202 A1 * | 9/2005 | Hoffmann | .............. | G02B 21/16 359/368 |
| 2009/0174935 A1 * | 7/2009 | Szulczewski | ...... | G02B 21/0048 359/368 |
| 2010/0327179 A1 * | 12/2010 | Preikszas | .............. | H01J 37/153 250/396 R |
| 2012/0080616 A1 * | 4/2012 | Schoenborn | ....... | G02B 21/0028 250/459.1 |
| 2013/0193315 A1 | 8/2013 | Shemesh | | |
| 2015/0077844 A1 * | 3/2015 | Singer | ................ | G02B 21/0032 359/385 |
| 2015/0364290 A1 * | 12/2015 | Enyama | ................ | H01J 37/153 250/396 ML |
| 2016/0181057 A1 * | 6/2016 | Frosien | ................. | H01J 37/153 250/398 |
| 2016/0246182 A1 | 8/2016 | Freimann et al. | | |
| 2019/0258052 A1 * | 8/2019 | Fahrbach | ............ | G02B 27/0037 |

FOREIGN PATENT DOCUMENTS

| | | |
|---|---|---|
| WO | 2007085290 A2 | 8/2007 |
| WO | 2018024786 A1 | 2/2018 |

* cited by examiner

OPTICAL ARRANGEMENT AND METHOD FOR CORRECTING CENTRATION ERRORS AND/OR ANGLE ERRORS

CROSS REFERENCE TO RELATED APPLICATIONS

This application claims priority to German Application No. 102019208232.7, filed Jun. 5, 2019, the disclosure of which is incorporated by reference herein in its entirety.

FIELD OF THE INVENTION

The invention relates to an optical arrangement and a method for correcting centration errors and/or angle errors.

BACKGROUND OF THE INVENTION

In imaging optical systems such as optical microscopes, imaging aberrations occur due to the optical elements, such as lenses, mirrors, etc. Said imaging aberrations can be compensated by a suitable choice and combination of the individual elements such that such an optical system having a plurality of individual lenses is free, or approximately free, of imaging aberrations.

The complexity required for compensating the imaging aberrations, for example, the number of optical elements required for sufficient correction or compensation, depends on the numerical aperture (NA) and the field angle or the field. The term compensation of imaging aberrations will largely be used below when optical elements are selected and aligned relative to one another in a targeted fashion to compensate imaging aberrations. Compensation can therefore be understood to be more of a static measure for reducing imaging aberrations.

If, by contrast, an active change of, for example, the position and/or angular position of optical element in a beam path takes place, the following text will largely refer to a correction.

An optical system consists of a plurality of assemblies for producing an imaged representation or an intermediate imaged representation. The same quality of correction is not required in every intermediate imaged representation. It is therefore also possible that imaging aberrations are compensated by aligning groups of optical elements relative to one another.

This group-wise procedure makes error reduction significantly easier. In addition, the final imaging quality is significantly improved and, owing to the comparatively small number of imaging elements, the total transmission of the system is greater. Optical systems having elements that are coordinated, such that imaging aberrations are compensated as much as possible, are also referred to as "Kompenssysteme" in German (compensated systems) and known from the prior art. One example of such a system is the objective and the tube lens in a microscope. In these, for example, the image field and the lateral chromatic aberration due to the objective are compensated by the effect of the tube lens. Between the objective and the tube lens, the intermediate images lie at infinity, and therefore this region is also referred to as the infinity space of the beam path.

In rotation symmetric systems with, for example, centered lenses or mirrors, most imaging aberrations increase as the distance from the optical axis or the field center increases. In many aberrations, the amplitude thereof over the field increases at least quadratically toward the field center of the assembly. A first-order lateral chromatic aberration increases linearly with the distance from the field center. The location of the image point is then dependent on the wavelength and the distance from the optical axis.

FIG. 1a schematically illustrates by way of example a compensated system 4 with a microscope objective 5 and a tube lens 6. The lateral chromatic aberration of the microscope objective 5 (upper partial image) and of the tube lens 6 (middle partial image) increase over the object field and then compensate one another again as a group (bottom partial image).

In FIG. 1b, the field of the tube lens 6 (middle partial image) is decentered relative to the microscope objective 5 (upper partial image). The lateral chromatic aberrations no longer compensate one another and a constant lateral chromatic aberration remains in the decentering direction as a resulting lateral chromatic aberration (bottom partial image). Depending on the degree of the dependence over the field, this effect is even increased.

Decentering for an optical system is easily remedied by way of an alignment. However, frequently, different interchangeable and/or settable optical elements are additionally present between the optical elements of a compensated system 4 such as the objective 5 and the tube lens 6 or within the compensated system 4. Such additional optical elements include, for example, beam splitters on a reflector turret, projections for optical sensors or different entrances/exits of a microscope, elements for switching over the optical beam path, zoom or magnification interchanger, filters on filter turrets, etc.

It is possible that the centration of the fields from objective 5 to tube lens 6 inadvertently changes when said additional optical elements are moved.

It is therefore necessary to align, possibly after each actuation operation, each of the additional optical elements individually in such a way that no angular error occurs within the infinity space of the beam path. This is highly complex and, for example as a result of manufacturing tolerances that occur and/or wear in mounts and bearings, impossible to achieve for all additional optical elements.

In general, possibilities for correcting imaging aberrations, such as for example the lateral chromatic aberration, are known from the prior art. In those, imaging aberrations that counteract the systemically occurring imaging aberrations in terms of direction and absolute value and thus bring about a resulting correction are produced in a targeted fashion.

WO 2018/024786 A1, for example, discloses a light sheet microscope or confocal microscope having an illumination optical unit for transmitting light of at least two wavelengths from at least one light source along in each case one wavelength-dependent beam path from an illumination side of the illumination optical unit to a sample side of the illumination optical unit.

The microscope has a lateral chromatic correction device having at least one optical lateral chromatic correction element. The beam paths of the at least two different wavelengths have at the sample-side exit of the lateral chromatic correction element an offset parallel to one another and/or a tilt relative to one another with respect to the illumination side. On the sample side of the illumination optical unit, the offset results in an offset of the foci of the at least two wavelengths transversely to an optical axis of the illumination optical unit. The offsets run counter to one another and therefore result in a correction.

SUMMARY OF THE INVENTION

The invention is based on the object of proposing a possibility for correcting centration errors and/or angular errors in particular in a compensated system.

This object is achieved by implementations according to the claims.

The optical arrangement for correcting centration errors and/or angular errors comprises, in a beam path, an optical compensated system, in which at least two optical elements are present and aligned relative to one another such that imaging aberrations of the optical elements are—as far as possible—compensated. To achieve the compensation of the imaging aberrations, the optical elements are selected and coordinated with respect to their optical effect.

The arrangement according to the invention is characterized in that a correction unit is arranged in an infinity space of the beam path and between the at least two optical elements. Owing to the effect of the correction unit, the propagation direction of radiation propagating along the beam path is changed. Either the correction unit has a reflective surface or the correction unit is embodied to be transmissive for the radiation. In addition, the correction unit is adjustable such that the angle of a change in the propagation direction can be set. The infinity space is a portion of the beam path in which rays travel parallel to one another through the beam path.

The invention at its core is based on a correction of occurring centration errors of optical fields, for example, of an object field. The centration errors of optical fields are also referred to as angular errors. Thus, the centration of the fields between the two optical elements of the compensated system is corrected.

The object fields in the beam path can be decentered, which can be caused by a tilt of the optical elements of the compensated system. This tilt takes place relative to a virtual reference ray that extends collinearly with respect to the optical axis of the first optical element. With a correction of centration errors and/or angular errors, decentration and/or tilt are reduced or eliminated.

Imaging aberrations are, in particular, the lateral chromatic aberration, the axial chromatic aberration, coma or astigmatism. These are minimized or eliminated with the compensated system and, if necessary, with the correction unit.

The optical elements of the compensated system can consist each of a plurality of optical components such as lenses and stops or assemblies. For example, an objective of a microscope typically can include a plurality of optical components.

In one possible embodiment of the optical arrangement, the correction unit can include a mirror. The latter is advantageously settable in a controlled manner and makes a correction of centration errors of the optical arrangement possibly, for example, by deflecting the rays by an angle absolute value.

In addition or alternatively thereto, the correction unit can have a prism pair. Each prism here can be rotatable about the normal of an entrance face of the relevant prism. The prisms of the prism pair can be formed in one piece or can be composed of a plurality of parts.

Any existing centration errors can be corrected as required and, for example, manually. In one advantageous development, the correction unit is settable in a controlled or feedback-controlled manner. To this end, for example a drive is present, which is controllable by way of a corresponding control unit. In the case of feedback control, at least one sensor can be present whose captured measurement values serve as the basis for the feedback control.

In a further embodiment of the optical arrangement, at least one of the optical elements of the compensated system can be inclined relative to the beam path. An angle of the relevant optical element relative to an optical axis of the beam path can thus be set.

To compensate for any inclination of one of the optical elements of the compensated system, it is also possible for a detector that is arranged downstream on the image side for capturing image data in the beam path and the compensated system to be designed so it is able to be inclined. Owing to the inclination of the detector, an object field inclination due to the inclined optical element of the compensated system can be compensated.

In all embodiments of the invention, it is possible that the centration error is corrected by way of actuating movements, in particular rotations, about an axis (one-dimensional) or about at least two axes (two-dimensional).

The object is additionally achieved by a method for correcting centration errors in a beam path of an optical arrangement according to the invention. The method comprises the steps of measuring a current imaging aberration and ascertaining a target position of the correction unit as a calibration value. The target position selected is a position in which a current imaging aberration is minimized within the framework of the system-based possibilities.

The correction unit is controlled such that it is brought into the target position. A current imaging aberration is measured, and the measurement result is compared to a permissible tolerance value. If the current imaging aberration exceeds the permissible tolerance value, a new target position is ascertained. If the current imaging aberration falls below the permissible tolerance value, in other words, if the current imaging aberration lies within the permissible tolerance limits, the method can be ended.

Imaging aberrations can include, in particular, the lateral chromatic aberration, the axial chromatic aberration, coma or astigmatism. At least one of these can be minimized or set to a minimum by way of the invention.

In a further embodiment of the invention, the method for correcting centration errors and/or angular errors can include the steps of defining an object field and arranging a sample at the center of the object field. Subsequently, the position of the imaged representation of the sample in an image field can be ascertained as a reference position. The ascertained image field position can be compared to an expected image field position, and a deviation found can be stored as a calibration value. In accordance with the calibration value, control commands with which the correction unit can be controlled are generated.

Further optical units, such as a filter wheel, can be arranged in the beam path of the compensated system. If an optical unit arranged in the beam path between the optical elements of the compensated system is interchanged for another optical unit for example by rotating the filter wheel, a new centration may be necessary or the accuracy of the current centration can be checked. To this end, the steps of ascertaining the position of the imaged representation of the sample in an image field (reference position), generating control commands, and controlling the correction unit can be repeated.

Ascertained calibration values can be stored in an advantageous embodiment of the method. In particular, the ascertained calibration values in relation to the optical elements and/or optical units located in each case in the beam path can be stored, with the result that it is possible to repeatedly access the stored values. To this end, the calibration values can be stored in a repeatedly retrievable form.

To access the stored calibration values, it can be ascertained in one embodiment of the method which optical elements and/or optical units are located as a current configuration in the beam path of the compensated system. In accordance with the ascertained current configuration, the associated stored calibration values can be retrieved and control commands are generated based on the retrieved calibration values.

It is possible using the optical arrangement according to the invention and the method according to the invention to correct not only lateral chromatic aberrations but also other aberrations that occur. For example, in addition to the imaging aberrations already mentioned above, it is also possible to correct those that are based on tolerances upon the exchange of interchangeable components. Advantageously, all aberrations that are not pupil-dependent but only location-dependent, such as image field curvatures, are able to be corrected. Compensation of pupil-dependent aberrations of the compensated system is possible if the correction unit is located close to the element that causes the angular error. In the case of minimum lateral chromatic aberration, all other imaging aberrations also can be minimized.

Advantageously, the invention can be used in particular in combination with a microscope stand and a laser scanning microscope (LSM) or a high-resolution microscope (PALM, SIM, STED), because these are particularly susceptible to imaging aberrations and in particular the lateral chromatic aberration. Further applications are possible in a microscope stand in which a large number of interchangeable components in the infinity space are used. Such interchangeable components are, for example, beam splitter turrets, post-magnification interchangers, objective turrets and emission filters.

BRIEF DESCRIPTION OF THE DRAWINGS

The invention is explained in more detail below on the basis of exemplary embodiments and figures. In the figures.

DETAILED DESCRIPTION

Figure 1:
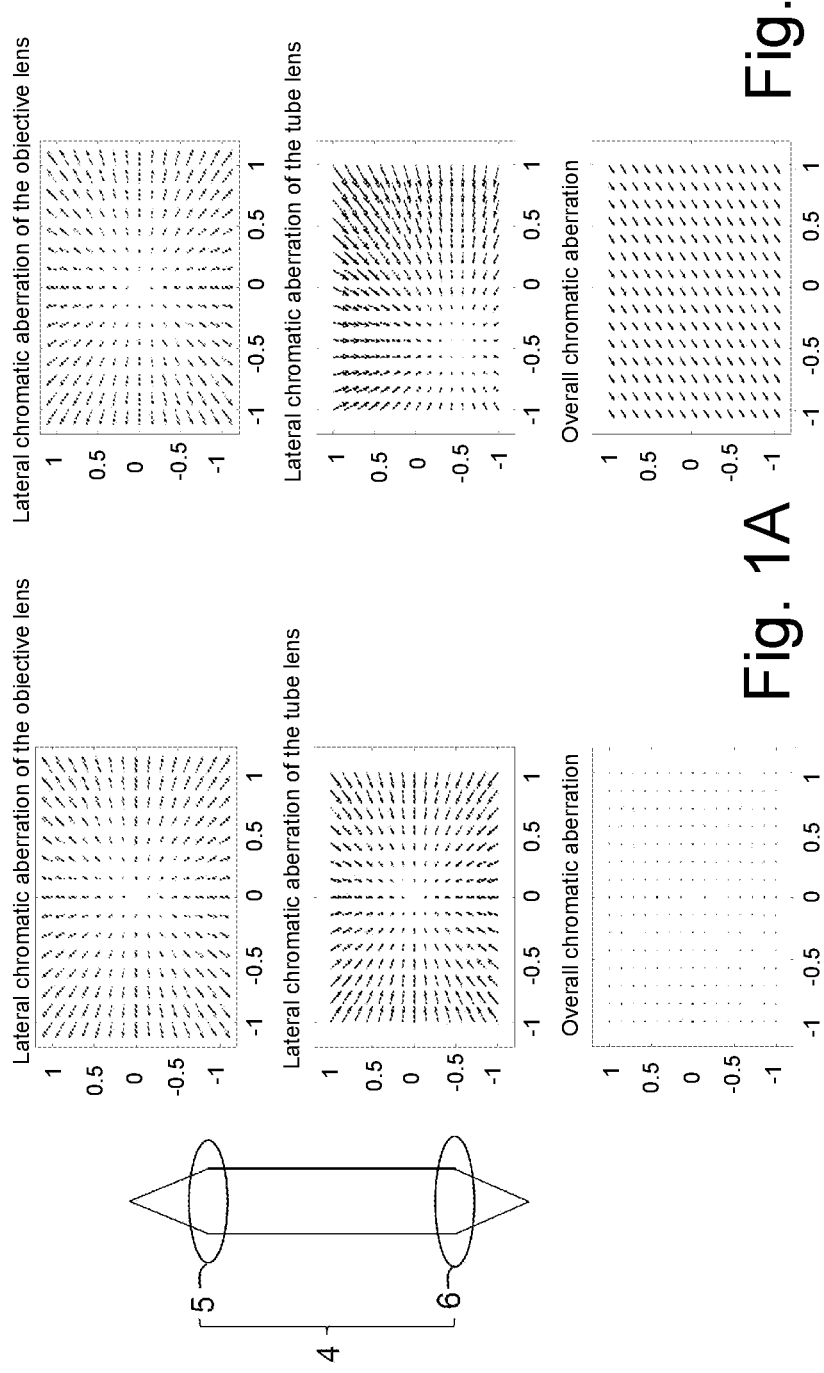
FIG. 1A shows a schematic illustration of a compensated system with a microscope objective and a tube lens and also of the lateral chromatic aberration of the microscope objective (upper partial image), the tube lens (middle partial image) and the resulting lateral chromatic aberration (bottom partial image), with the resulting lateral chromatic aberration being zero.
FIG. 1B shows a schematic illustration of the lateral chromatic aberration of the microscope objective (upper partial image), the tube lens (middle partial image) and the resulting lateral chromatic aberration (bottom partial image), with the resulting lateral chromatic aberration not being equal to zero.
Figure 2:
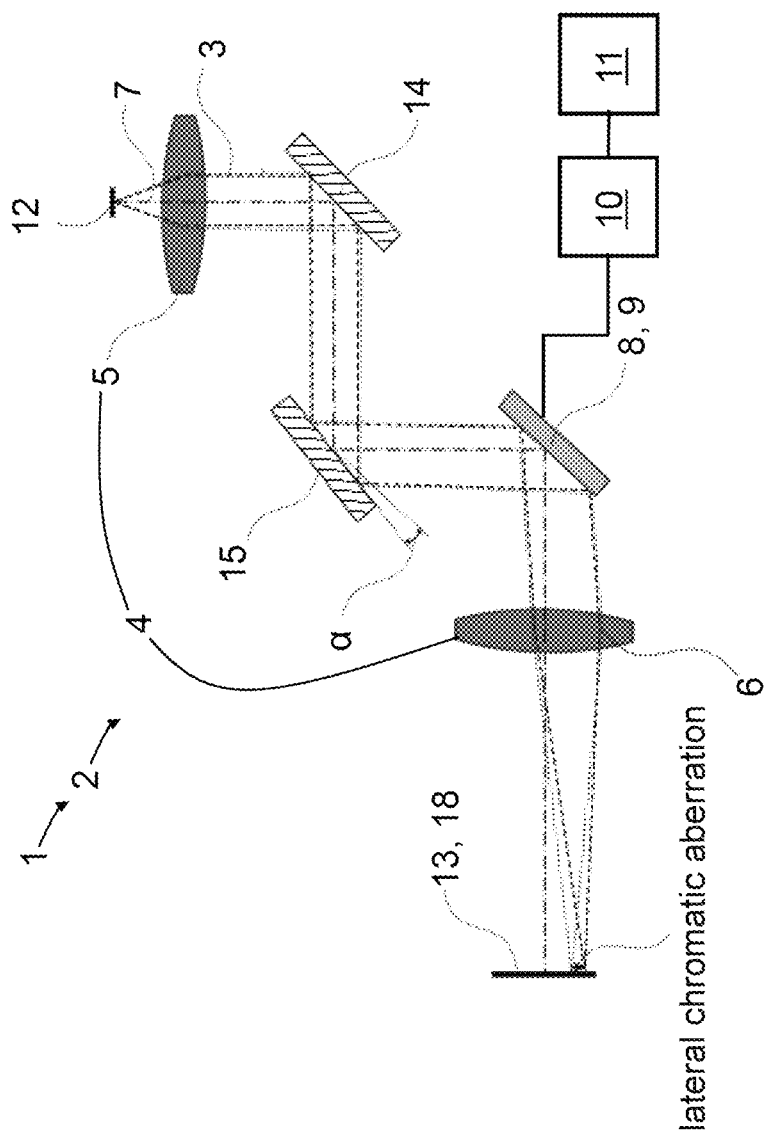
FIG. 2 shows a schematic illustration of a first exemplary embodiment of an optical arrangement according to the invention with an occurring centration error and a lateral chromatic aberration in the image plane.

FIG. 2 shows, as a first exemplary embodiment of the invention, a microscope 1 with an optical arrangement 2. An objective 5 and a tube lens 6 are present as the optical elements of a compensated system 4 in a beam path 3 of the compensated system 4. A correction unit 8 comprising a mirror 9 is present on the optical axis 7 of the beam path 3 in the infinity space of the beam path 3 between the objective 5 and the tube lens 6. Said mirror 9 is adjustable by being controlled or feed-back controlled by way of a drive 10, wherein the drive 10 is controllable by way of control commands of a control unit 11. Radiation captured by way of the objective 5 travels from an object field 12, for example on or in a sample (not illustrated) to be imaged and/or observed, along the optical axis 7 to a first interchangeable component 14 and a second interchangeable component 15 as respectively reflective additional optical units in the beam path 3. The second interchangeable component 15 has, based on its position relative to the optical axis 7, an angular error α. The radiation deflected with this angular error α is incident on the mirror 9 of the correction unit 8 and is reflected toward the tube lens 6, by way of whose effect the radiation is focused at the plane of an image field 13. A detector 18 for capturing image data can be arranged in the plane of the image field 13.

Owing to the angular error α imparted on the radiation, the ray course shown by way of example is focused not along the optical axis 7 into the image field 13, but rather a deviation from the optical axis 7 occurs. The absolute value of the deviation here also can be dependent on the wavelength of the captured radiation. FIG. 2 shows by way of example the profiles of rays of two wavelengths, the points of incidence of which in the image plane 13 are located away from the optical axis 7 as lateral chromatic aberration.

Figure 3:
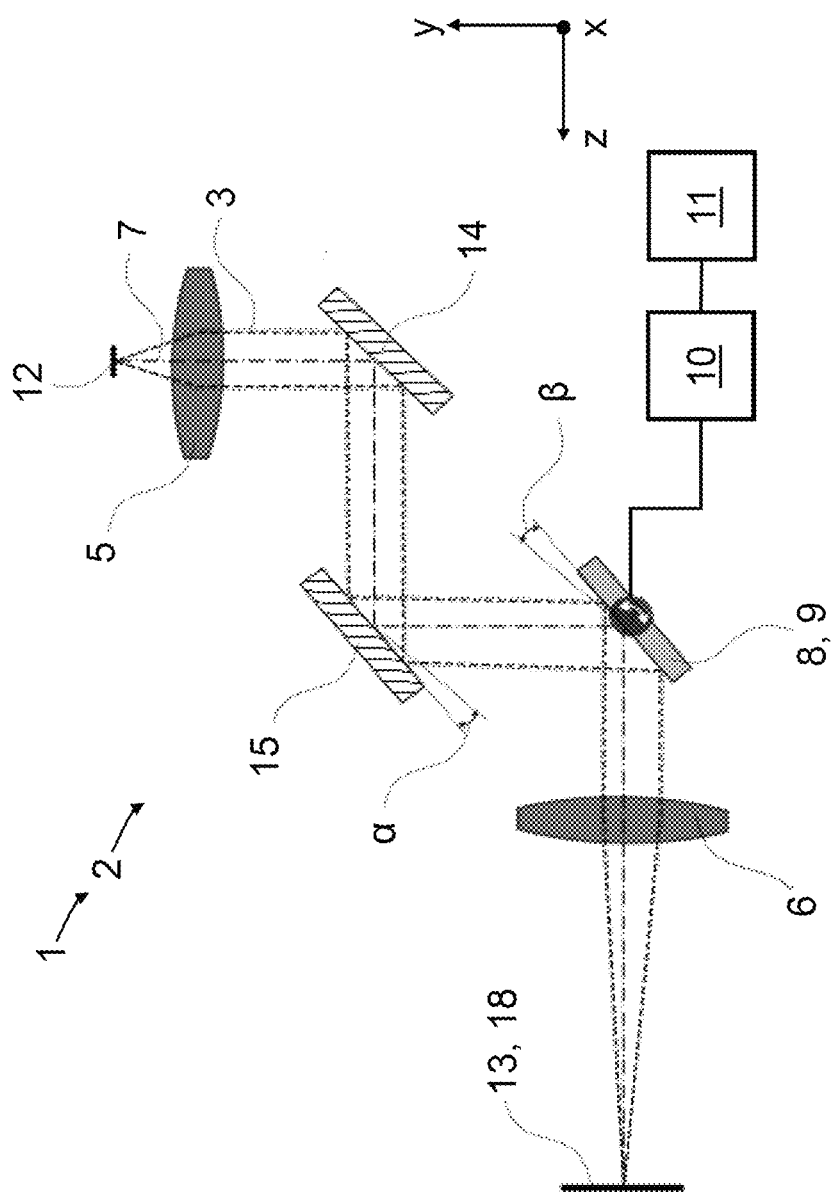
FIG. 3 shows a schematic illustration of the first exemplary embodiment of an optical arrangement according to the invention with a corrected centration error and without residual lateral chromatic aberration in the image plane.

If such a lateral chromatic aberration is ascertained or if required calibration values are held retrievably in a database, corresponding control commands are generated by way of the control unit 11 and transmitted to the drive 10. The drive 10 is used to incline the mirror 9 of the correction unit 8 by a correction angle β. The correction angle β is chosen such that the rays of all wavelengths are incident again on the optical axis 7 into the image plane 13 or on the detector 18 and no lateral chromatic aberration occurs any more (FIG. 3).

In further embodiments of the invention, in particular of the method and the configuration of the control unit 11, alternative or additional imaging aberrations such as axial chromatic aberration, coma and/or astigmatism can be corrected.

The correction unit 8 can be embodied for an inclination of the adjustable mirror 9 about the x-axis x, the y-axis y and/or the z-axis z of a Cartesian coordinate system, and correspondingly it is also possible for multiaxial angular errors to be corrected.

Figure 4:
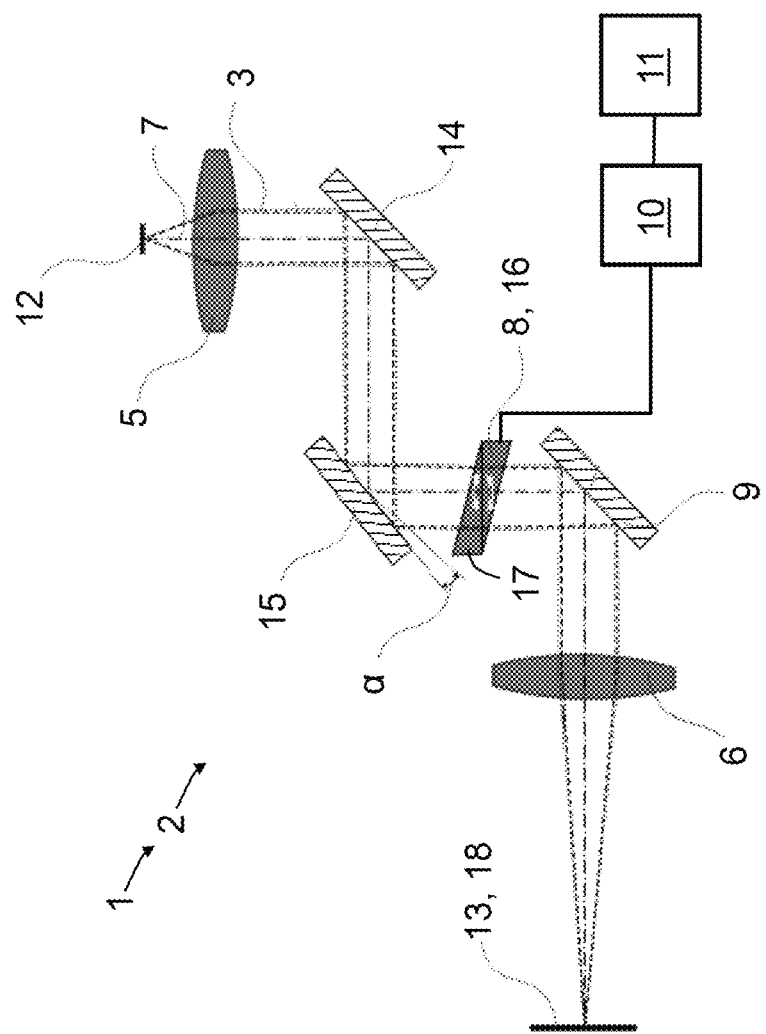
FIG. 4 shows a schematic illustration of a second exemplary embodiment of an optical arrangement according to the invention with a prism pair in the infinity space of the beam path.

The correction unit 8 in a second exemplary embodiment according to FIG. 4 can have a (difference) prism pair consisting of a first prism 16 and a second prism 17. Both prisms 16, 17 can be rotated in each case and independently of one another about the normal of an entry face of the relevant prism 16, 17 in a manner controlled by the drive 10. The drive 10 is designed for a delivery movement of each individual prism 16, 17.

Figure 5:
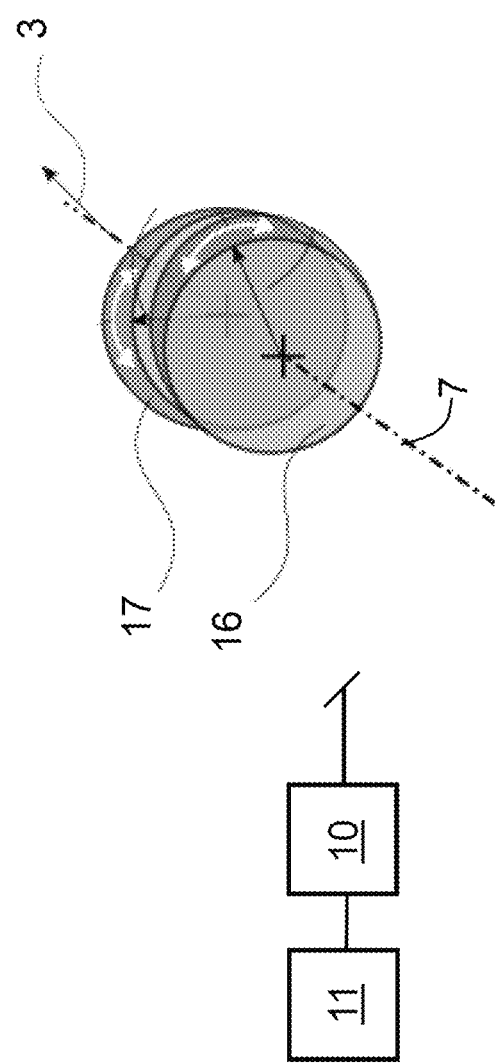
FIG. 5 shows a schematic illustration of a prism pair and of a drive and a control unit.

The mode of action of such a prism pair is illustrated in FIG. 5. A ray that is incident along the optical axis 7 onto the entry face of the first prism 16 is deflected by the effect of the first prism 16 in the direction of the front arrow. Due to the effect of the second prism 17, a deflection in the direction of the middle arrow can take place. The effectively effective deflecting effect and direction of the ray after passage through the prism pair can be obtained from the vector addition of the two prismatic effects and is symbolized by the beam path 3 in the direction of the rear arrow.

The effective prismatic effect can be advantageously set so that the lateral chromatic aberration in the plane of the image field 13 is corrected. The lateral chromatic aberration of the prism pair can additionally be used to correct the lateral chromatic aberration. The latter can be constant over the image field 13. The center of the image field 13 here can be offset slightly in the case of an optimally corrected lateral chromatic aberration.

An improved embodiment consists in the use of two achromatic prisms 16, 17, whereby the offset of the image field center can be compensated in the case of an optimally corrected lateral chromatic aberration. Each prism 16, 17 of the difference prism pair consists for example of two individual prisms that are advantageously bonded or cemented together and are made from materials (e.g. glasses) having different dispersion properties.

Figure 6:
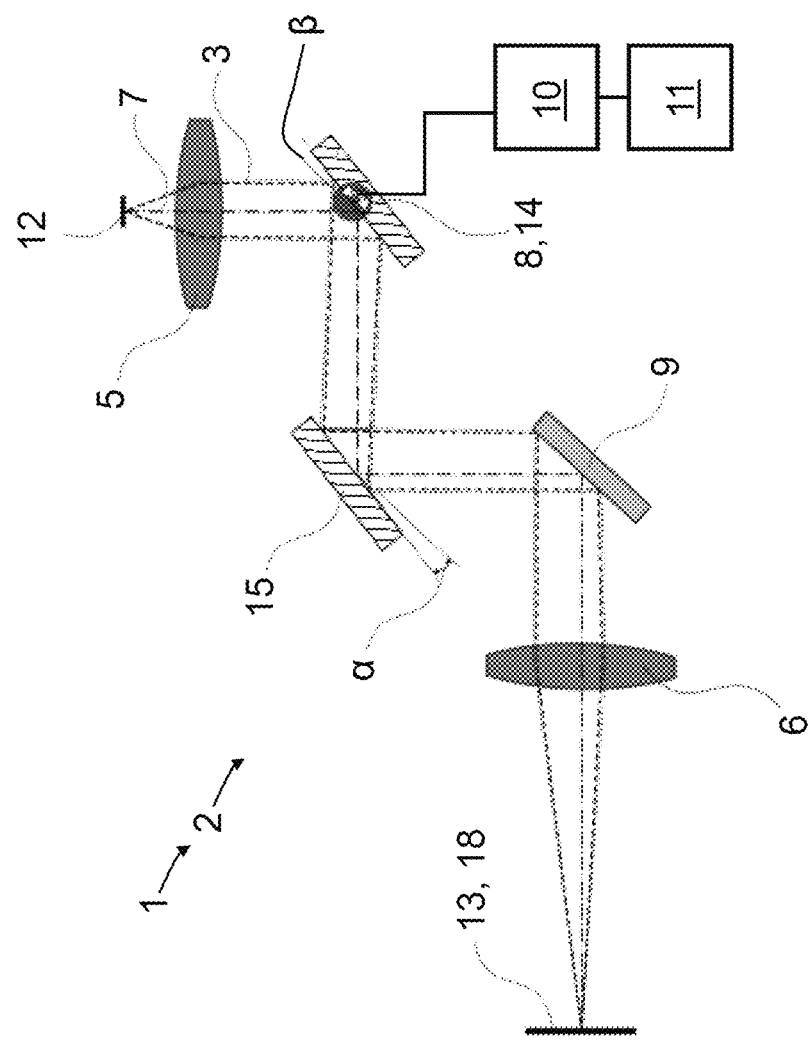
FIG. 6 shows a schematic illustration of a third exemplary embodiment of an optical arrangement according to the invention with a correction unit and an additional optical element in the infinity space of the beam path.

A third exemplary embodiment of an optical arrangement 2 according to the invention with a correction unit 8 and two additional optical elements 9, 14 in the infinity space of the beam path 3 is shown in FIG. 6. The correction unit 8 is arranged downstream of the objective 5 and is itself embodied as a first interchangeable component 14. The latter is adjustable and additionally acts as a correction unit 8. An angular error α caused by the second interchangeable component 15 can be corrected by correspondingly inclining the correction unit 8 by the correction angle β. The second interchangeable component 15 is for example a reflector turret, output coupling mirror or an additional beam splitter turret.

Figure 7:
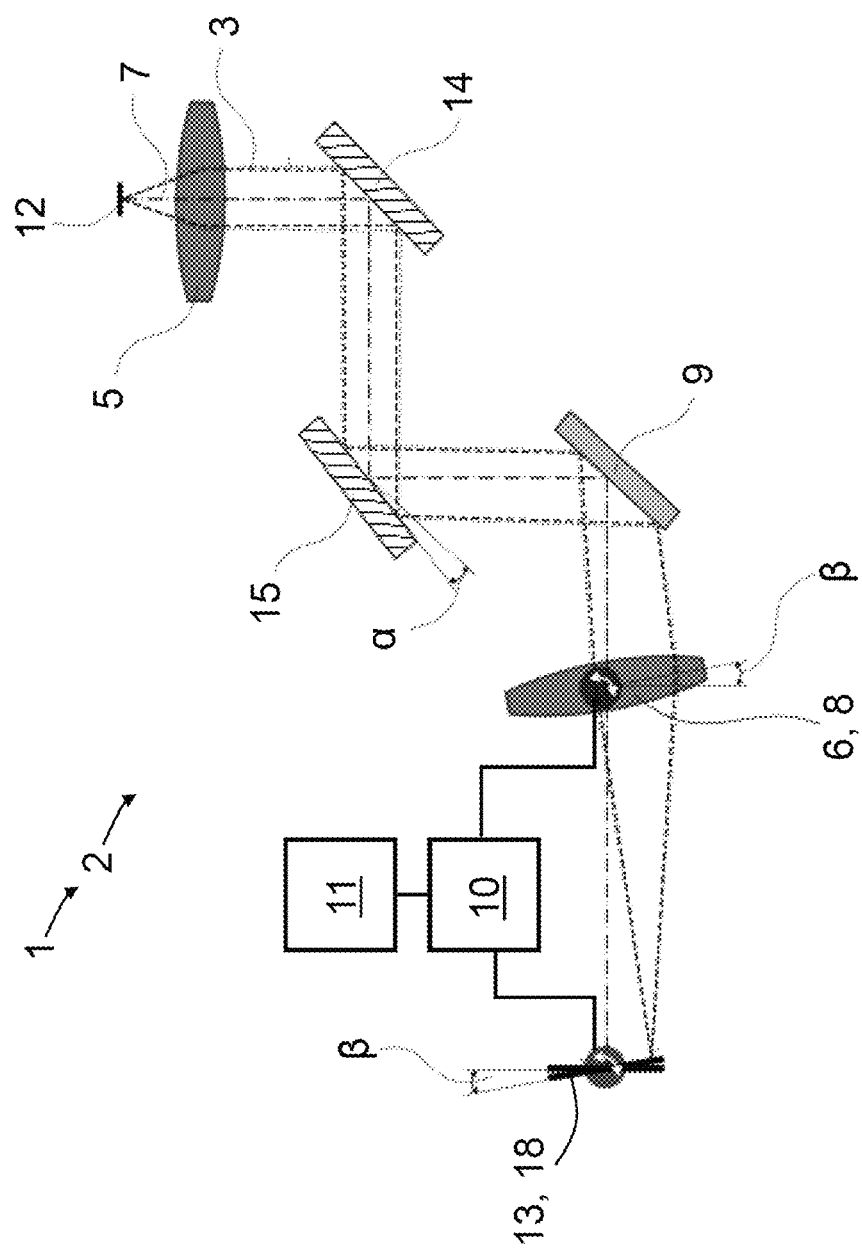
FIG. 7 shows a schematic illustration of a fourth exemplary embodiment of an optical arrangement according to the invention, in which one of the optical elements of the compensated system and a detector are designed so they are able to be inclined.

In a fourth exemplary embodiment, at least one of the optical elements of the compensated system 4, in the case illustrated the tube lens 6, can be movable in a controlled fashion, in particular able to be inclined (FIG. 7).

The tube lens 6 can here be set individually with respect to the different additional interchangeable components 14, 15 that are effective currently in the infinity space. With the tilt or inclination of the tube lens 6, the inclination of the object field 12 that is to be imaged sharply into the plane of the image field 13 also changes. Optionally, the image field 13, e.g. the detector 13 in the form of for example a camera sensor or the camera, can be inclined to compensate for the inclination and be able to capture a perpendicularly illuminated image field 13.

In the exemplary embodiment according to FIG. 7, an angular error α is introduced into the beam path 3 due to the second interchangeable component 15. Said angular error is compensated by correspondingly inclining the tube lens 6 by the correction angle β using the control unit 11 and the drive 10. In addition, the image field 13 is correspondingly inclined by inclining the detector 18 used using the drive 10.

The invention claimed is:

1. A method for correcting errors in a beam path of an optical system, the optical system including an optical compensated system having a plurality of optical elements in which at least two optical elements of the plurality of optical elements are aligned relative to one another such that imaging aberrations of the at least two optical elements are compensated and a correction unit arranged in an infinity space of the beam path and between the at least two optical elements, wherein the correction unit is configured to change a propagation direction of radiation propagating along the beam path and the correction unit either has a reflective surface or is embodied to be transmissive for the radiation, and wherein the correction unit is adjustable such that an angle of a change in the propagation direction can be set, the method comprising the steps of:

defining an object field and arranging a sample at a center of the object field;

ascertaining a position of an imaged representation of the sample in an image field as a reference position;

comparing the ascertained image field position to an expected image field position as a calibration value; and generating control commands corresponding to the calibration value and controlling the correction unit.

2. The method according to claim 1, further comprising:

interchanging at least one optical unit arranged in the beam path between the optical elements of the compensated system for another optical unit, and repeating the steps of ascertaining the position of the imaged representation of the sample in an image field as a reference position, generating control commands, and controlling the correction unit.

3. The method according to claim 1, further comprising storing the calibration value in relation to the optical elements that are located in each case in the beam path in a repeatedly retrievable form.

4. The method according to claim 3, further comprising:

ascertaining the optical elements located in the beam path of the compensated system as a current configuration;

retrieving the calibration value stored in accordance with the ascertained configuration; and generating control commands based on the retrieved calibration value.

* * * * *